Patented June 21, 1927.

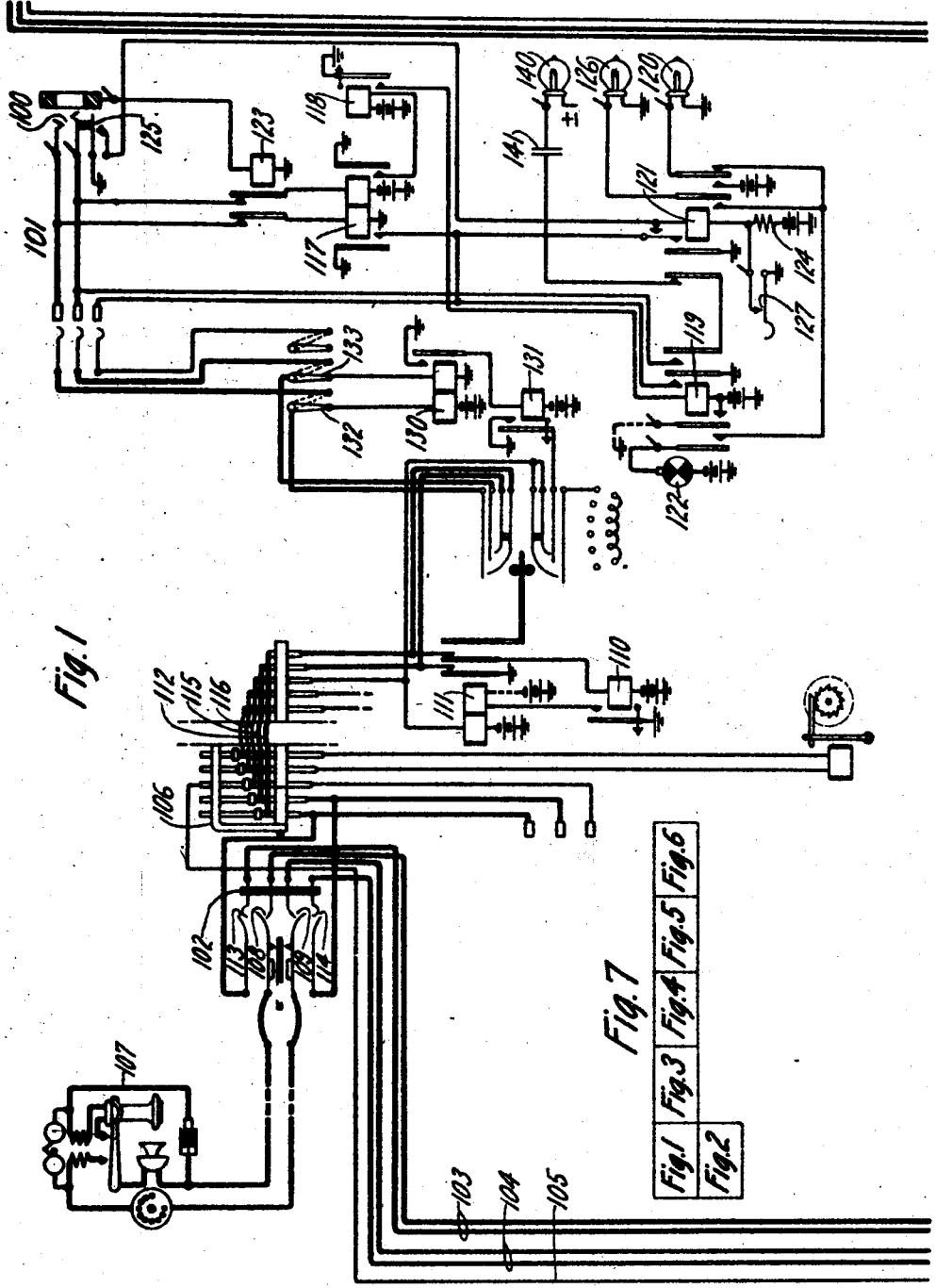

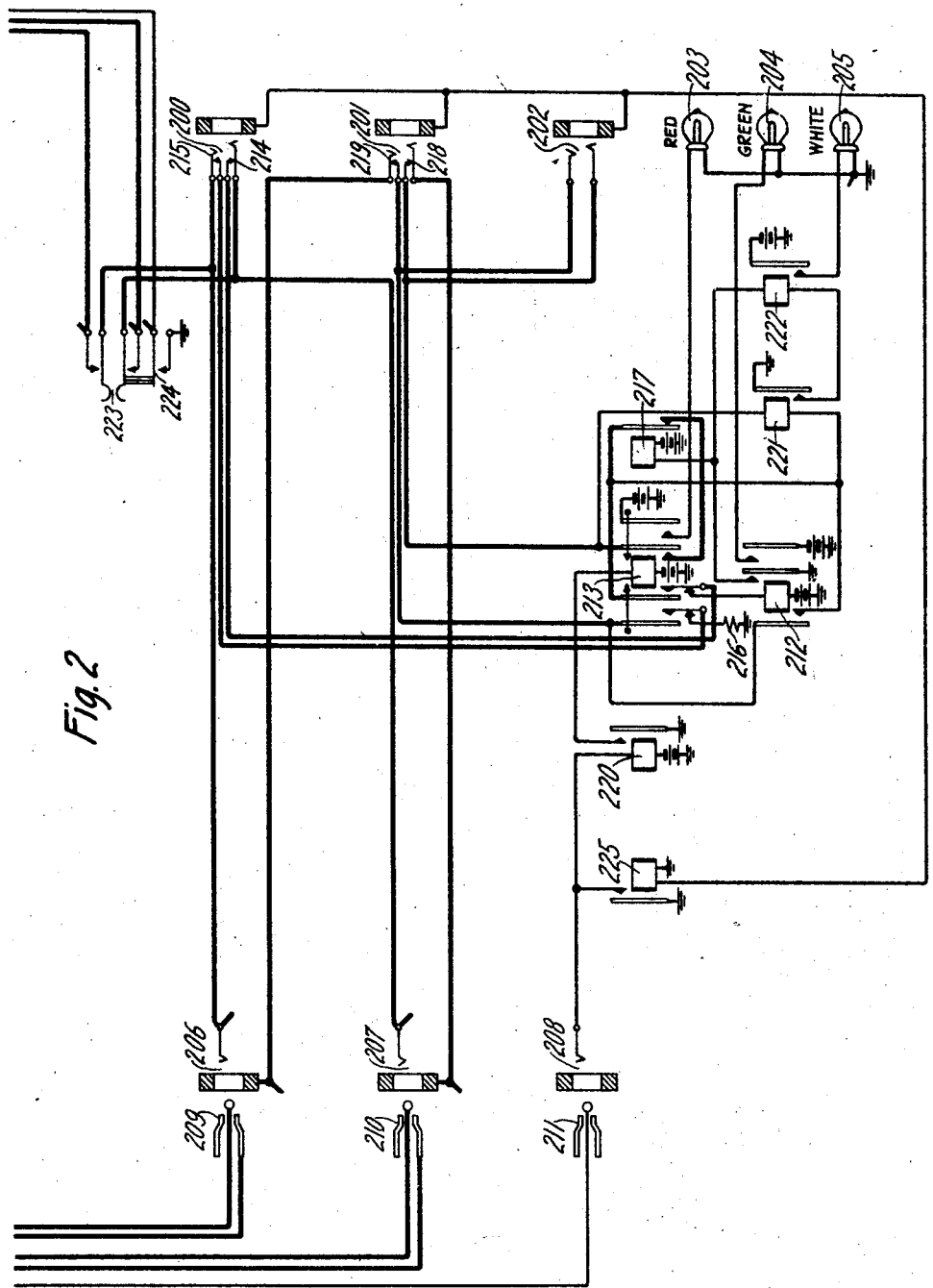

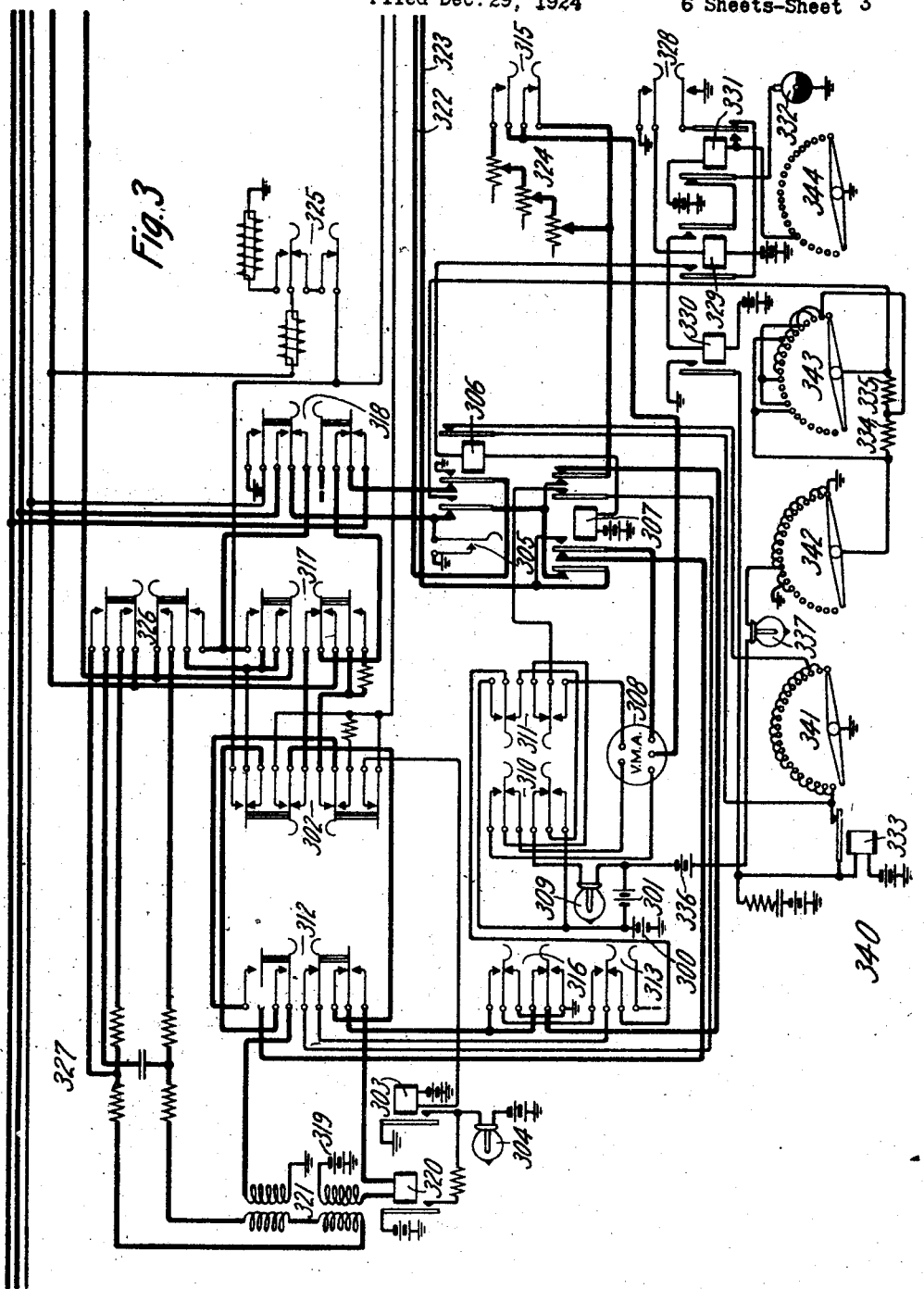

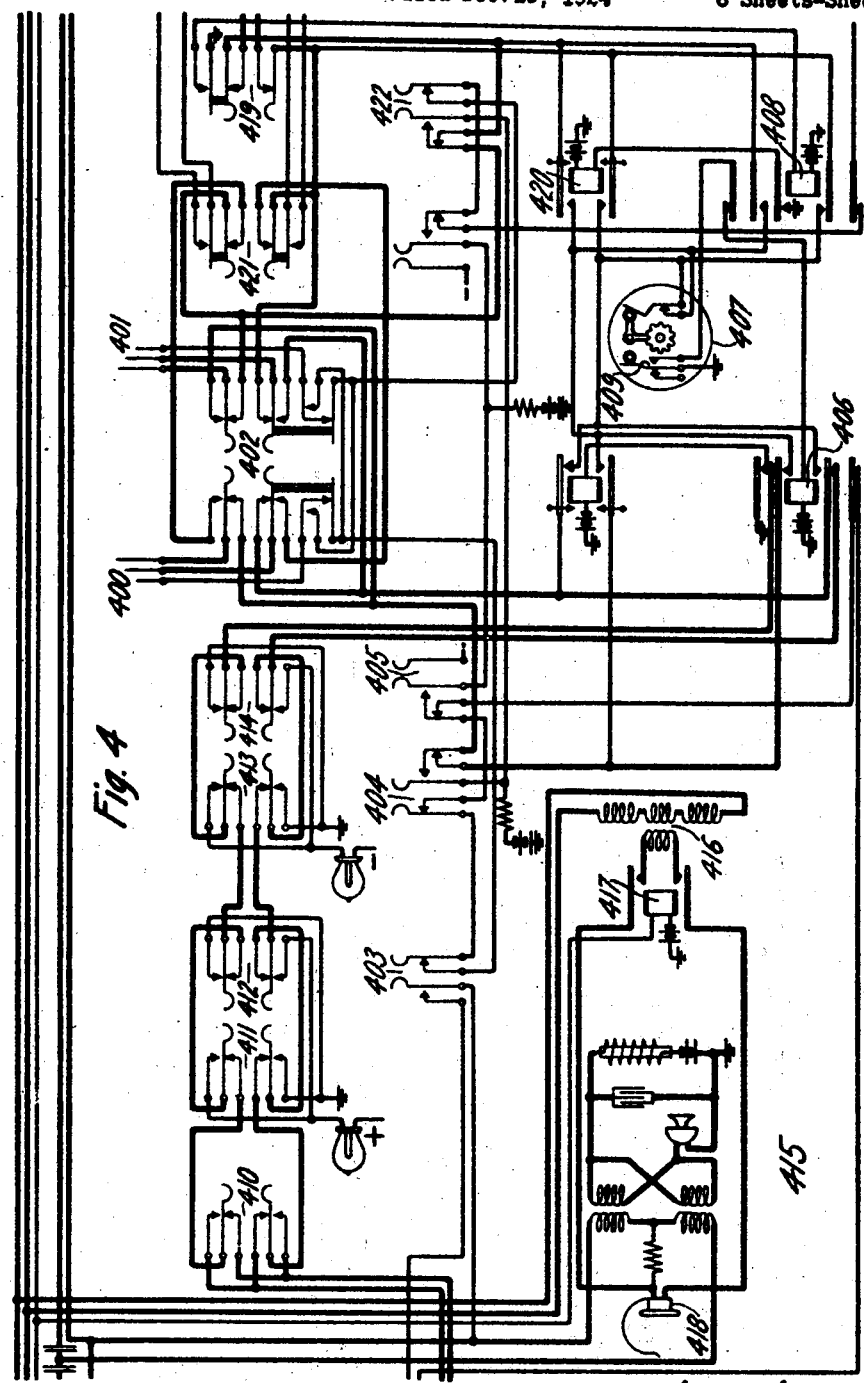

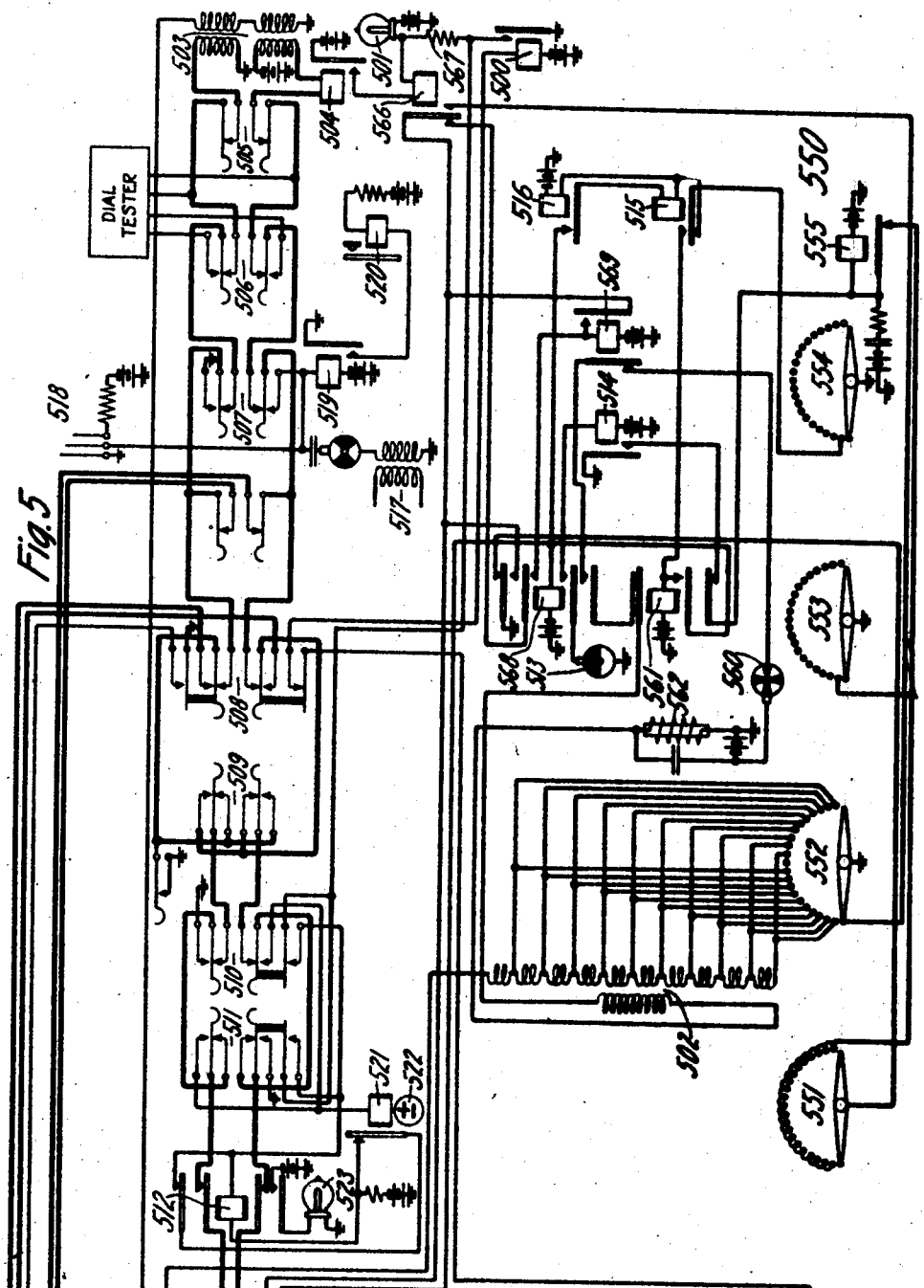

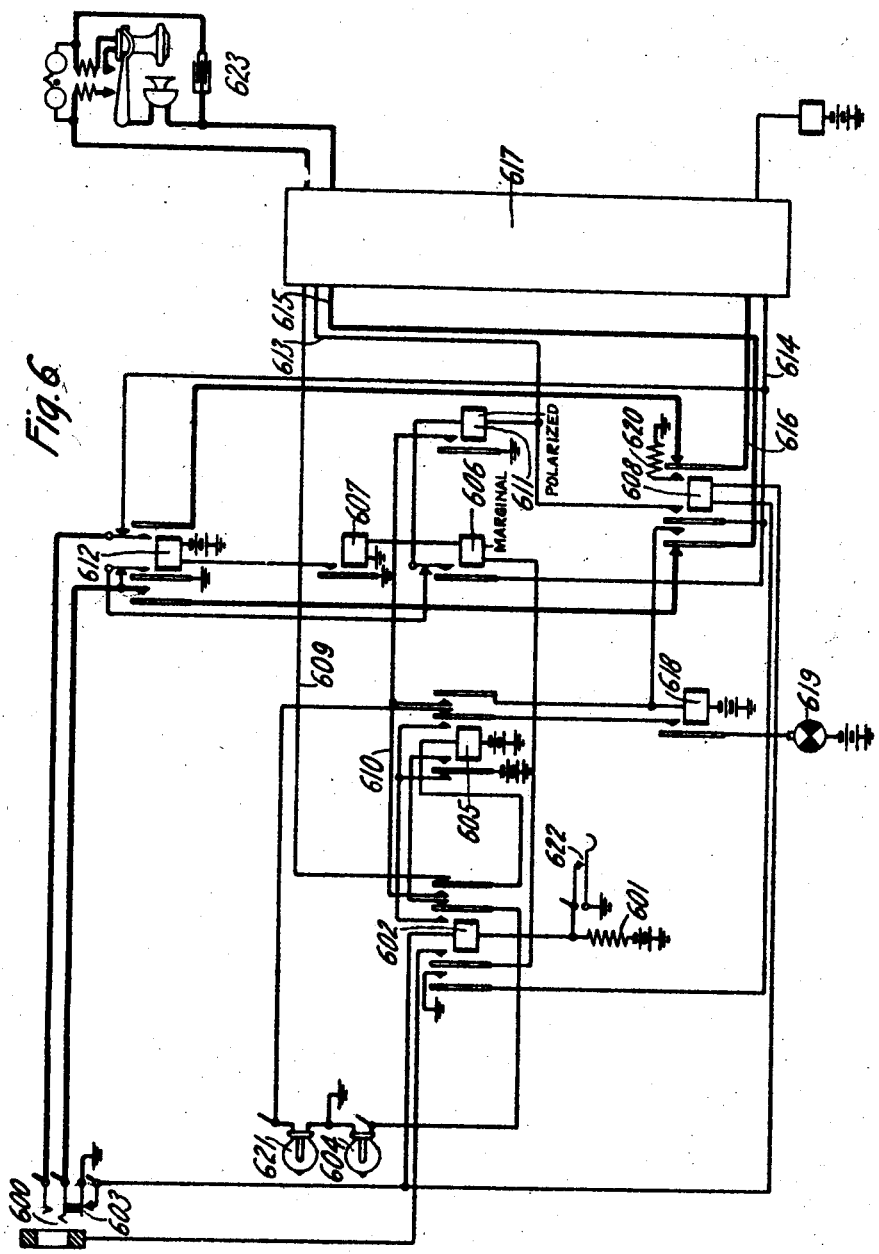

1,632,886

UNITED STATES PATENT OFFICE.

LOUIS T. COX, OF BROOKLYN, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed December 29, 1924. Serial No. 758,558.

This invention relates to testing systems and more particularly to circuit arrangements for testing subscribers' lines terminating in machine switching central offices.

An object of the invention is to provide an improved arrangement of circuits and apparatus to enable an operator at a test desk to connect with a subscriber's line in a machine switching central office and to conduct routine and special tests on said line and the associated substation apparatus.

A feature of the invention lies in the provision of means for holding the connections established over trunk lines connected with subscribers' lines when the operator removes the plug from the trunk jack.

Another feature of the invention lies in the provision of means for indicating the operation or non-operation of plunger type line switches.

The invention may be more readily understood by reference to the following description considered in connection with the accompanying drawings in which Figs. 1 and 2 show means for observing a line on which intermittent troubles occur; Fig. 1 also shows a trunk circuit incoming to the test desk; Figs. 3, 4 and 5 show the circuits of the test desk for conducting various tests on the subscriber's line. Fig. 6 shows a trunk circuit leading to automatic switches for connecting with a subscriber's line. Fig. 7 is a diagram showing the manner in which the several sheets of the drawing should be arranged to show as much of a complete organization of circuits as is necessary to illustrate the manner in which various tests of the subscribers' lines may be made.

Description of apparatus.

For enabling the test operator to conduct routine and special tests, testing equipment as shown in Figs. 1 to 5 is provided. The routine tests are required generally to ascertain whether the subscriber's line is devoid of "shorts", "grounds" and "crosses" with the central office battery or other foreign E. M. F., that the capacity of the line is correct and the insulation resistance of the line is satisfactory. These tests are usually made as a matter of routine. Among the devices employed in making such tests are a test battery comprising batteries 300 and 301, a voltmilliammeter 308 and various keys.

Among the special tests conducted by the special operator are what are hereinafter termed howler test, sounder test and adjustment of subscribers' bells as well as tests for temporary unstandard conditions. These tests as a rule are only made when trouble on the line has been reported. This equipment may be associated with either one of the two test cords, one of which is termed a primary test cord and the other a secondary test cord. With the primary test cord which terminates in plug 400 are grouped those testing devices which are necessary for making the routine tests and certain other tests inseperably associated with the use of a voltmilliammeter. In the secondary test cord which terminates in plug 401 are grouped those testing devices which do not involve the use of a voltmilliammeter. By means of a test cord interchange key 402, the primary and secondary test circuits can be interchanged with respect to their plugs. This arrangement enables the test operator to employ his time more efficiently since those tests such as howler, sounder and adjustment of subscribers' bells which are apt to consume considerable time are associated with a separate circuit. This arrangement also enables the test operator to make routine tests on one line connected to a primary test circuit and to conduct special tests on another line connected to the secondary test circuit at the same time.

The test combination intended primarily for determining the character of trouble consists of a 100 volt battery poled opposite to central office battery and having a 20 volt tap. In Fig. 3 of the drawings, the 100 volt battery includes batteries 300 and 301, the former being the 20 volt tap. The voltmilliammeter has the following scale: 0 to 120 volts—100,000 ohms; 0 to 24 volts—20,000 ohms; 0 to 24 volts—1,000 ohms; also reading 0 to .024 amperes and 0. to .480 amperes. The 100 volt test battery is used in connection with the 100,000 ohm 120 volt scale, while a tap from this battery to give 20 volts is used with the 20,000 ohm 24 volt scale and the 1,000 ohm 24 volt scale. The milliammeter is used for connection with the central office battery when making resistance measurements. By having the full scale deflection of the voltmilliammeter register 120 volts and by having the test battery poled opposite to the central office battery, the test operator is enabled to quickly detect crosses with the latter battery, in that the reading will be in excess of 100 volts by an amount equal to the voltage of the central office battery.

The howler apparatus includes a step-by-step switch for controlling the gradual application of the howler tone. For testing the dial at the substation a dial tester is schematically shown within the rectangle of Fig. 5 of the drawing. This apparatus may be of the type shown and described in Patent No. 1,391,947 of September 27, 1921 to E. W. Gent.

Description of operation.

The test operator will conduct a test either over the primary test cord terminating in plug 400 or over the secondary test cord terminating in plug 401. The insertion of plug 400 into jack 600 of the trunk circuit of Fig. 6 closes a circuit from battery, through resistance 601, winding of relay 602, contact 603 of jack 600 to ground. The operation of relay 602 in this circuit causes the lighting of red lamp 604, in a circuit from battery, left back contact of relay 605, inner right front contact of relay 602, lamp 604 to ground. The lighting of this lamp indicates that the trunk is in use. Relay 602 in operating also connects the sleeve of jack 600 over the inner left front contact of relay 602, through the windings of relays 606 and 607 to ground. It likewise closes a circuit for relay 608 from battery, through resistance 601, winding of relay 602, winding of relay 608, outer left front contact of relay 602 to ground which circuit is ineffective due to the ground connected to the winding of relay 602, from contact 603 of jack 600. In addition relay 602 disconnects relay 605 from conductor 609, outgoing to the selector switch and connects it over the outer right front contact of relay 602, to conductor 610, putting it under the control of polarized relay 611. The extension of the sleeve of jack 600 through the windings of relays 606 and 607 to ground, completes a circuit for these relays which may be traced from the sleeve of jack 600, sleeve of plug 400, contacts of keys 402, 403, 404 and 405, lowermost back contact of relay 406, contact of key 302, winding of relay 303 to battery. Relays 606, 607 and 303 operate. The operation of relay 607 closes an obvious circuit for relay 612 and the operation of relay 606 bridges relay 611 across operating conductors 613 and 614 outgoing to the test distributor represented by the rectangle 617. Relay 612 operates and at its front contact connects the tip and ring of jack 600 to the test conductors 615 and 616 outgoing to the test distributor. The operation of relay 612 also connects ground over its inner left front contact to the normal contact of relay 606 which is ineffective since relay 606 is operated at this time. Relay 303 also operates and lights lamp 304 to indicate that the primary cord is in use.

The test man now operates his dial 407. The operation of the dial closes a circuit from battery through the winding of relay 406, upper back contact of relay 408, off normal contact 409 of dial 407 to ground. The operation of relay 406 opens the previously traced circuit for relays 303, 606 and 607. These relays release in turn releasing relay 612. The release of these relays connects operating leads 613 and 614 to the tip and ring of jack 600 from whence the tip extends over the tip of plug 400, left contact of key 402, contact of key 404, inner upper contact of relay 406, to one of the interrupter springs of the dial 407 and the ring conductor extends by way of the ring of plug 400, contact of key 402, inner lower front contact of relay 406 to the other interrupter spring of dial 407. As the dial returns this circuit is repeatedly opened to control the selector switch shown diagrammatically by rectangle 617. The switches represented by this rectangle may be of any desired type but the circuit arrangement is more specially adapted for step-by-step switches of the type shown in United States Patent No. 1,481,586, issued to W. A. Benson, January 22, 1924.

When the dial comes to rest on the completion of a digit, relays 606, 607 and 612 are reoperated and the bridge is again completed across the operating leads 613 and 614. At the completion of dialing, if the connected line is not busy, the tip and ring of the test jack 600 are closed through to the tip and ring of test leads 615 and 616. The test man may now make any test he desires since these leads have neither ground, battery nor bridge of any kind on them. If the connector or line is busy, reversed battery is connected to leads 613 and 614 so that polarized relay 611 operates connecting ground to the winding of relay 605, which relay operates and closes a circuit for relay 618. The operation of relay 618 closes a circuit from battery through interrupter 619, over the front contact of relay 618, inner right front contact of relay 605, inner right front contact of relay 602, through lamp 604, to ground causing lamp 604 to flash to indicate that a busy condition has been encountered.

If the test man desires to hold this connection while making some other test he removes plug 400 from jack 600. The removal of the plug opens the circuit of relays 606 and 607 which relays release, in turn releasing relay 612. However, relay 602 is held operated in a circuit from battery through resistance 601, winding of relay 602, winding of relay 608, outer left front contact of relay 602 to ground. Relay 608 is permitted to energize by opening the energizing circuit of relay 602 at contact 603. The operation of relay 608 connects test lead 615 to relay 618 and test lead 616 to ground through resistance 620. This prevents the release of the connection and also provides means for indicating to the test man if the subscriber initiates a call or a trouble man connects to the line. The operation of relay 618 in response to the initiation of a call closes a circuit from battery, through interrupter 619, contact of relay 618, inner right back contact of relay 605, lamp 621 to ground. In order to release a connection it is necessary to close the key 622. If the plug is in the jack, the operation of this key shunts relay 602 thus releasing relays 606, 607 and 612 disconnecting the leads from the test distributor from the trunk circuit. If the plug is not in the jack, the operation of key 622 shunts both relays 602 and 608 and releases the connection.

Tests with primary cord circuit.

To conduct a routine test the operator actuates the ground key 305 thereby connecting ground to the tip side of the subscriber's line over the path extending from ground, contact of key 305, outer left back contact of relay 306, outer left back contact of relay 307, conductor 323, contacts of keys 410, 411, 412, 413, 414, inner upper back contact of relay 406, right normal contact of key 404, contact of reversing key 402 to the tip of plug 400, tip of jack 600, right alternate contact of relay 612, right back contact of relay 608 to test conductor 616 and thence to the tip side of the subscriber's line. The voltmeter 308 and the batteries 300 and 301 are then connected in series with the ring side of the line over the path extending from batteries 300 and 301, lamp 309, contact of keys 310 and 311, contact of key 313, contact of key 312, inner right back contact of relay 307, contact of keys 310 and 311, voltmeter 308, contact of key 315, outer right back contact of relay 307, contact of key 316, contact of keys 312, 302, 317, 318, inner left back contact of relay 306, conductor 322, contacts of keys 410, 411, 412, 413, 414, inner lower back contact of relay 406, contact of key 402, through the ring of plug 400 to the ring of jack 600, outer left front contact of relay 612, outer left back contact of relay 608, test conductor 615, and thence to the ring side of the subscriber's line.

The operator then actuates the reversing key 410. When this key is actuated there will be a deflection of the needle of the voltmeter 308. The amount of the deflection of the needle of the voltmeter is then a measure of the capacity across the line including the substation apparatus 623. When the needle comes to rest it measures in parallel the resistance between the two sides of the line and between the tip side of the line and ground, the amount of deflection indicating whether a short, a ground or insulation resistance is being measured. If the needle comes to rest so as to give a deflection in excess of 100 volts it indicates that the tip side of the line is probably crossed with the office battery.

The reverse key is then restored to give the same indications as above with regard to the ring side of the line.

The operator then restores the ground key to normal position. Generally the test operator pays little attention to the reading of the voltmeter upon this movement of the key. From the foregoing it is obvious that the second and third movements of the reversing key are the important ones. If the position of the needle in its deflected position and its normal position are satisfactory it indicates that the called line is in a normal condition. Of all tests made on the subscribers' lines, approximately 90% of the tests show the line to be in normal condition, so that it is evident from the foregoing tests, that the test operator is enabled to verify this fact in a simple and quick manner. It is also evident that if the testing operator's work is such that he can leave the ground key in its operated position, only two movements of the reverse key are necessary in order to verify that a line is in normal condition. If the "at rest" position of the needle is not satisfactory, further tests are made to obtain a more definite idea of the nature of the trouble. By leaving the ground key in its normal position and by operating and restoring the reverse key, the test operator is enabled to detect whether the trouble is a "short" or "ground" on the tip, a "ground" on the ring, or a combination of these troubles by referring to his chart which shows various deflections of the needle for various kinds of trouble.

Voltmilliammeter scale change keys.

If the test operator wishes to obtain some further idea of the size of the "short" or "ground", he operates a scale change key which connects into circuit that winding of the voltmilliammeter most nearly equal in resistance to that of the "short" or "ground" to be measured. Scale change key 311 connects 20 volt test battery and the 0 to 24 volt 20,000 ohm winding into the circuit. The scale change key 310 is operated to connect the 20 volt test battery and the 1,000 ohm winding of the voltmilliammeter in circuit. Key 312 when operated connects battery 319 to supervisory relay 320 through one winding of repeating coil 321 in series

Measurement of foreign potentials and voltage of test batteries.

If the test operator wishes to obtain more definite information regarding the voltage of an external source of potential, shown by the routine tests to be crossed with the subscriber's line, he operates the foreign E. M. F. key 313, and when necessary the voltmilliammeter reverse key 316. These keys also permit the test operator to measure earth potentials. The foreign E. M. F. key 313 when operated disconnects at its normal contacts the 100 volt and 20 volt test batteries from the windings of the voltmilliammeter and instead connects a ground thereto through its alternate contact. The voltmilliammeter reverse key 316 reverses the winding of the voltmilliammeter with respect to the line. The voltmilliammeter reverse key must be used when the external potential is of such polarity as to cause the needle to tend to deflect off the scale in a reverse direction. Because of the fact that the 120 volt scale of the voltmilliammeter has a very high resistance, earth potentials can be measured with considerable accuracy even if there be a few thousand ohms resistance in the external circuit. The 20,000 ohm circuit and the 1,000 ohm circuit are also available in making measurements of external potentials. The circuit arrangement is such that if the voltmilliammeter reverse key 316 alone is operated the voltage of the 100 volt test battery is observed and if in addition key 311 is operated the voltage of the 20 ohm test battery is observed.

Talking, listening and monitoring tests.

If the test operator wishes to converse with a subscriber or trouble man on the line, he operates simultaneously key 312 and the key 317. The actuation of these keys connects one winding of repeating coil 321 and the supervisory relay 320 in series with the tip and ring talking conductors 322 and 323, which are extended to the tip and ring of test plug 400 and thence to the subscriber's line. It also bridges the operator's telephone set 415, across conductors 323 and 322. The current from the source 319 then flows over the talking conductors 323 and 322 and thence over the path previously traced from the substation to the called subscriber or apparatus of the trouble man at said station for the purpose of supplying talking battery thereto.

For the purpose of enabling the test operator to monitor on the circuit, the monitoring key 318 is supplied which key when actuated causes the disconnection of the talking operator's transmitting circuit and the regular receiving circuit from the tip and ring talking conductors of the cord circuit and connects thereto the test operator's receiver through a high efficiency repeating coil 416. It will be noted that the actuation of key 318 completes an obvious circuit from ground at its upper contact winding of relay 417 to battery. The actuation of key 318 also connects the primary winding of repeating coil 416 to the tip and ring conductors 322 and 323 at the test operator's cord circuit. The operation of relay 417 connects the operator's receiver 418 in operative relationship with the secondary winding of the repeating coil 416 so that the test operator may listen in on the line of station 623.

Transmission test.

Transmission tests on subscribers' lines are made before substations are put in service and in connection with the investigation of transmission complaints. This test embodies the following features. An adjustable artificial subscriber's line is used for reducing the current through the transmitter at the subscriber's loop under test to a definite value which will be the same for tests on all loops. Thus by equalizing current supply losses on the different loops a fairly uniform test condition is produced which will permit a definite loop condition being used as a basis of comparison. An artificial trunk line is employed for connection in circuit between the trunk side of the repeating coil supplying current to the substation loop and the testing operator's talking set. The purpose of this artificial trunk is to increase the total transmission equivalent of the testing circuit to about 30 miles of standard cable, thus representing the transmission to be obtained on an electrical toll or long distance connection. In addition, it is the general experience that small differences in the volume of transmission can be detected more readily where the transmission equivalent is in the neighborhood of 20 or 30 miles. A talking test between the test operator and the installer or trouble man at the substation is also provided. This test should render it possible to discover defects which would cause any serious transmission loss. For equalizing the current supply to the different substations, a variable resistance rheostat 324 is provided. By means of this rheostat the resistance included in the circuit thereby may be varied from 0 to approximately 3000 ohms. This rheostat is normally disconnected from the test circuit but may be connected thereto by the operation of key 315.

When making a transmission test the operator actuates key 326, thereby connecting the test operator's telephone set 415 through contacts of key 326 to the artificial cable 327 which is in turn connected to the left winding of the repeating coil 321. Key 312 is then actuated to connect the primary winding of coil 321 in circuit with the subscriber's substation. The test operator then actuates key 315 and adjusts rheostat 324 until the needle of the voltmilliammeter 308 indicates that .040 amperes is flowing out over the subscriber's loop. This current corresponds to that flowing in a standard loop. By building out the substation loop in this manner and by introducing the transmission cable, the transmission takes place over a circuit approximating 30 miles of standard cable.

*Line insulation break down test.*

It is sometimes desirable to test the insulation of conductors or terminal banks of the office. To accomplish this a 200 volt source of potential is supplied to the line through the voltmilliammeter 308. When reverse key 410 is in its normal position a test is made on the ring side of the line. When the break down test key 328 is operated an obvious circuit is closed for relay 329 which closes a circuit from battery through the winding of relay 330, over the right front contact of relay 329, left back contact of relay 331, interrupter 332 to ground. When interrupter 332 closes the above traced circuit, relay 330 operates and connects ground to the winding of stepping magnet 333 which controls switch 340. Magnet 333 attracts its armature. This circuit is opened when interrupter 332 opens its contact permitting magnet 333 to retract its armature and step the switch to its next position. The circuit is again closed when the interrupter again closes its contact, so that the switch is rotated under the control of interrupter 332. With key 328 closed and relay 329 operated a circuit is completed from battery through the windings of relays 307 and 306, left front contact of relay 329, right back contact of relay 331 to ground at the lower contact of key 328. These relays operate. The operation of relay 307 connects the brush 342 to conductor 323 through the ammeter winding of the voltmilliammeter. The operation of relay 306 connects ground to conductor 322 and opens the restoring circuit of the stepping magnet. With switch 340 in its normal position ground is connected over brush 342, through resistances 334 and 335 to the outer left front contact of relay 306 and thence to conductor 323 which is normally extended to the tip of plug 400. Resistances 334 and 335 are of such a value as to give in combination with the resistance of the line and the ringer at the substation approximately 100,000 ohms.

In position 1 a shunt is closed around resistance 335 and in position 2 a shunt is closed around both resistances. Hence ground is connected gradually to the side of the line to be tested to avoid too rapid discharge of the capacities which may exist on the line and possible tapping of subscriber's bells. In position 3, a 200 volt battery made up of sources 300, 301 and 336 through lamp 337 is connected through resistances 334 and 335 to conductor 323. As in the case of the ground connection, in position 4 resistance 335 is shunted and in positions 5, 6, 7, 8, 9 and 10, both resistances are shunted so as to produce full potential on the line. In position 11 the shunt around resistance 334 is removed and in position 12 both shunts are removed. In position 13 ground is again connected to conductor 323 through resistances 334 and 335, in position 14 resistance 335 is shunted and in position 15 both resistances are shunted to gradually produce full ground potential and a complete discharge of the conductor. If the insulation is not satisfactory the current indicated by the voltmilliammeter will exceed that normally produced by the 200 volts over the normal line circuit and the amount of such difference is an indication of the extent of the fault in the insulation. When switch 340 reaches position 16 a circuit is closed from battery, winding of relay 331, No. 16 terminal and brush 344 to ground. Relay 331 operates and locks over its right front contact and the lower contact of key 328 to ground. The operation of relay 331 opens the circuit of relay 330 and that relay releases. It also opens the circuit of relays 307 and 306. With switch 340 in position 16 a self-interrupting circuit is closed through the winding and contact of magnet 333, No. 16 to 21 terminals of brush 341 to ground, in which circuit switch 340 is restored to normal. Relay 331 remains locked to key 328, until that key is restored. Should the operator restore key 328 before the completion of the cycle of operations above described, the release of relay 329 and the subsequent release of relay 306 closes a circuit from battery, winding and back contact of magnet 333 right back contact of relay 306, terminals 1 to 15 of brush 341 to ground, in which circuit switch 340 is stepped to its No. 16 terminals and from thence to normal in the restoring circuit previously described.

*Tests using secondary test cord.*

When the operator conducts the special tests hereinbefore mentioned the secondary test plug 401 is employed. The insertion of this plug into jack 600 causes the operation of relay 602 as previously described. Relay 607, 606 and 500 are also operated. The operation of relays 606 and 607 are effective to produce the same results as in the case of a primary cord. The operation of relay 500 closes an obvious circuit for lighting lamp 501 to indicate that this secondary cord is in use. In order to dial over the secondary cord it is necessary to operate key 419 which closes an obvious circuit for relay 408. The operation of relay 408 connects the impulse springs of the dial 407 across the tip and ring conductors of plug 401. It also opens the circuit of relay 406 to prevent the connection of the dial to the primary test plug. The operation of the dial serves to control the test distributor and connector to connect with any desired substation.

*Howler test.*

It often occurs that at substantions the receiver is unintentionally left off the hook. This causes trouble at the central office. In order to attract the attention of the subscriber, a tone, hereinafter called the howler tone, is connected to the subscriber's line. Assume that the subscriber at substation 623 has left the receiver off the hook and that the test operator by means of secondary test plug 401 establishes a connection with that line. When this connection is completed supervisory relay 504 will be operated in a circuit extending from battery through repeating coil 503, winding of relay 504, contact of keys 505, 506, 507, 508, 509, 510 and 511, inner lower back contact of relay 512, contact of key 419, left contact of transfer key 402 to the ring of plug 401 and thence over the ring conductor of substation 623 through which the circuit is completed due to the receiver being off the hook, back over the tip conductor to plug 401, contacts of keys 402, 422 and 419, inner upper back contact of key 512, and thence through keys 511, 510, 509, 508, 507, 506 and 505, and winding of repeating coil 503 to ground. Due to the operation of relay 504 and the previously noted operation of relay 500, a circuit is completed from battery through the contact of relay 504, winding of relay 566, resistance 567 contact of relay 500 to ground.

The operator will next actuate howler key 421. The operation of key 421 connects the secondary of repeating coil 502 in series with the secondary of repeating coil 503. It also disconnects the tip and ring conductors of plug 400 from the secondary test cord. In addition it closes a circuit from battery through the winding of relay 568 lowermost contact of key 421, front contact of relay 566, normal contact of brush 552 of howler switch 550 to ground. Relay 568 operates in this circuit and locks from battery, winding of relay 568, lowermost contact of key 421, outer upper front contact of relay 568 to ground. The operation of relay 568 prepares a circuit for relay 569 through the inner upper front contact of relay 568 to the back contact of relay 566. The operation of relay 568 completes a circuit from battery, through interrupter 560 over the left back contact of relay 569, outer lower front contact of relay 568, upper back contact of relay 561, through the primary winding of repeating coil 502, through impedance coil 562 to ground. Due to this circuit a tone is induced in the secondary of repeating coil 502 and in the secondary of repeating coil 503, producing a tone in the subscriber's receiver by means of the primary of repeating coil 503. A circuit is also completed from ground through interrupter 513, inner lower front contact of relay 568, winding of relay 514 to battery. Relay 514 is momentarily operated as the interrupter 513 rotates and completes a circuit from battery, through stepping magnet 555 of switch 550, lower back contact of relay 561 front contact of relay 514 to ground. Magnet 555 operates in this circuit and steps the brushes of switch 550 to the first position. In so doing it interrupts the energizing circuit of relay 568 but that relay is held operated in the above traced holding circuit. Each time interrupter 513 closes its conducting segments, relay 514 operates, in turn operating magnet 555 to advance switch 550 one step.

Switch 550 continues to rotate under the control of interrupter 513 until it is restored to normal. As the switch passes from position 1 to position 10 and from position 11 to position 20 additional sections of the secondary of repeating coil 502 are included in the circuit and removed therefrom step by step. Hence the howler tone is progressively increased and diminished. When the selector brushes pass terminal 21 ground is connected over brush 554 over the back contact of relay 515, winding of relay 516 to battery. Relay 516 operates and completes a locking circuit for itself including the winding of relay 515, contact of relay 516, lower contact of key 421, upper outer front contact of relay 568 to ground. Relay 515 does not operate until switch 550 leaves position 21 since it is shunted by the energizing circuit of relay 516. When brush 554 reaches position 22 and this circuit is opened relay 515 operates in series with relay 516. Switch 550 makes a second revolution under the control of interrupter 513. When the switch reaches terminal 21 a second time a circuit is completed from battery through the winding of relay 561, front contact of relay 515, No. 21 terminal of brush 554 to ground. Relay 561 operates and locks in a circuit including its inner lower front contact in parallel with relay 568. The operation of relay 561 opens the circuit including the primary winding of repeating coil 502. It also opens the operating circuit of stepping magnet 555 of switch 550 preventing this switch from making an additional revolution. In order to cause the howler switch to make additional revolutions the howler key 421 must be restored and reoperated. If during the time that the howler switch is rotating the subscriber hangs up his receiver, relay 504 releases and in turn releases relay 566. With relay 566 released, a circuit is completed from battery, winding of relay 569, inner upper front contact of relay 568, back contact of relay 566, outer upper front contact of relay 568 to ground. Relay 569 operates and locks over its right front contact to the outer upper front contact of relay 568. The operation of relay 569 opens the primary circuit of repeating coil 502 removing the howler tone from the subscriber's line. Since relay 569 is locked, even though the subscriber again removes his receiver from the hook the howler tone is not reapplied thereto unless the test operator releases and reoperates the key 421. The locking circuit of relays 568, 561, 515 and 516 is opened upon the restoration of key 421. The release of relay 568 in turn releases relay 569. If the howler key 421 is restored while the selector switch 550 is rotating, a self-interrupting circuit is completed for magnet 555 extending over the back contact of that magnet to the strapped off-normal contacts of brush 551, the outer upper back contact of relay 568 to ground, for restoring the switch to normal.

Sounder test.

The sounder is provided as an aid for locating and checking the cable conductors both inside and outside the office to assist the trouble man in locating a particular wire. A source of tone 517 may be connected to the secondary cord circuit by the actuation of key 507. In order not to interfere with the use of the secondary test cord a separate cord terminating in plug 518 is provided. If the plug 518 is inserted in jack 600, or the key 507 is operated when the plug 401 is inserted in jack 600, and a short circuit is placed across the line of the subscriber at substation 623, relay 519 will operate, thereby causing the sounder 520 to be actuated to attract the attention of the test operator.

Ringer test—adjusting subscriber's bells.

In order to signal the substation 623 after a connection has been established by means of the secondary test plug 401 the test operator may actuate key 511 to connect ringing current to the station 623. The actuation of key 511 completes a circuit for operating relay 512 over a path extending from battery, winding of relay 512, in parallel with the back contact of relay 521 and the outer upper back contact of relay 512, to the lower contact of key 511, contact of relay 500 to ground. Relay 512 does not operate in this circuit as long as the shunt exists. The path of ringing current may be traced as follows: from a source 522, through the winding of relay 521, upper contact of key 511, inner upper back contact of relay 512, contact of keys 419, 422, right contact of reversing key 402 to the tip of plug 401 and thence over the tip of the jack 600 and over the subscriber's line back to the ring of jack 600 and plug 401, contact of keys 402 and 419, inner lower back contact of relay 512, contact of key 511 to ground. Relay 521 does not energize when key 511 is operated but when the party at substation 623 answers, sufficient current flows therethrough to operate that relay. Relay 521 in operating opens the shunt around relay 512 whereupon relay 512 operates. Relay 512 in operating disconnects the ringing current from the subscriber's substation and closes an obvious circuit for lamp 523 to indicate that the subscriber has answered. If the bell at that substation is being tested the trouble man thereat will adjust the bell until a proper ring is received whereupon he will inform the test operator. The test operator will then restore the ringing key to the normal position thereby causing the restoration of ringing relays and the lamp 523.

Incoming test line.

The test man is also supplied with a number of jacks such as jack 100, connected to trunks appearing in selector switches, such as trunk 101 shown in Fig. 1. As shown, the trunk 101 is connected to terminals of a first selector. This circuit is primarily used for calling the test man. When a trouble man or inspector desires to call the test desk, a code is dialed which directs a selector to the terminals connected to an incoming trunk terminating in a jack such as jack 100.

With a telephone set bridged across the line conductors, whether that of the subscriber or the trouble man, a circuit is completed from battery through the right winding of relay 117, inner contact of relay 123, over the telephone set, back over the outer contact of relay 123 and through the left winding of relay 117 to ground. The operation of relay 117 closes an obvious circuit for relay 118 which in turn closes a circuit for relay 119. The operation of relay 119 closes a circuit for red lamp 120 over the right back contact of relay 121, outer left front contact of relay 119, interrupter 122 to battery, the red lamp 120 flashing in this circuit. The operation of relay 119 connects ground to the sleeve of trunk 101 at the selector marking it busy to other selectors which may attempt connection therewith. Relay 119 also closes a circuit from a source of ringing current through lamp 140, condenser 141, left back contact of relay 121, outer right front contact of relay 119 over the ring conductor through the telephone set connected therewith back over the tip conductor to ground through the left winding of relay 117. This circuit causes a tone in the telephone receiver indicating that the test man is being signaled. Relay 118 is slow to release so that, should further dialing be attempted at the time this trunk is selected, the operation of relay 117 in response to dial impulses will not permit the release of the connection.

Assuming that the test man inserts plug 400 of the primary cord circuit in jack 100, a circuit is completed from battery, through the winding of relay 303, contact of key 302, lower back contact of relay 406, contact of keys 405, 404, 403 and 402, sleeve of plug 400, sleeve of jack 100, winding of relay 123 to ground. Relays 123 and 303 operate in this circuit. The operation of relay 123 opens the circuit of line relay 117. Relay 303 lights lamp 304 as before. The insertion of the plug in the jack also closes a circuit from battery, resistance 124, winding of relay 121, contact 125 of jack 100 to ground. Relay 121 operates and locks over its inner left front contacts to ground. The operation of relay 121 opens the flashing circuit of lamp 120 and substitutes direct battery, so that red lamp 120 is now steadily lighted. It also prepares a circuit for lamp 126 over its inner right front contact to the outer left contact of relay 119 which is open at this time since relay 117 is released. Relay 121 also connects a substitute ground to the sleeve of trunk 101 holding the trunk busy.

Should the test man remove his plug from jack 100 relay 123 releases. This connects relay 117 to the tip and ring conductors again. If the trouble man still has his test set connected across the line, relay 117 will operate in turn operating relays 118 and 119. The operation of relay 119 completes the previously traced circuit for lamp 126 over its outer left front contact through interrupter 122 to battery causing lamp 126 to flash. Relay 121 being locked in a local circuit continues to hold the trunk busy and to maintain red lamp 120 lighted until released by the depression of key 127 which shunts the winding of that relay and permits it to release.

*Detection of intermittent troubles.*

The test desk is also supplied with a plurality of jacks such as 200, 201 and 202 which connect with apparatus for detecting intermittent trouble on subscribers' lines. Associated with each set of jacks is a set of lamps 203, 204 and 205 for indicating such troubles. These test jacks lead to a set of jacks 206, 207 and 208 which appear on the main distributing frame for the purpose of interconnecting this test line with a subscriber's line. When there is cause to suspect intermittent trouble on a subscriber's line, jacks 206 and 207 are connected to the subscriber's line and central office apparatus by means of a special test plug 102 which is inserted at the distributor frame in the place of the heating coils and which is connected to plugs 209 and 210 by means of cords 103 and 104. Jack 208 is connected to the sleeve conductor of the central office apparatus by means of plug 211, cord 105 and test clip 106. Assuming that plug 102 has been connected to line 107, if the subscriber at that substation initiates a call a circuit is completed from battery through the winding of relay 212, inner left back contact of relay 213, contact 214 of jack 200, tip of jack 207, tip of plug 210, contact 109 of plug 102, over the ring of the subscriber's line through substation 107, back over the tip conductor, contact 108 of plug 102, tip of plug 209, tip of jack 206, contact 215 of jack 200, outer left back contact of relay 213, resistance 216 to ground. Relay 212 operates in this circuit and closes an obvious circuit for lamp 204 which is green in color and indicates that the tip and ring of the subscriber's line have been connected. Relay 212 also closes a circuit from battery, through the winding of relay 217, inner right front contact of relay 212 to ground. In addition relay 212 closes a circuit from battery through the winding of relay 110 of the subscriber's central office equipment, outer right back contact of relay 111, jumper wire 112 of the distributor frame, contact 113 of plug 102, sleeve of plug 209 and jack 206, contact 219 of jack 201, left front contact of relay 212, winding of relay 221, and contact 218 of jack 201, sleeve of jack 207 and plug 210, contact 114 of plug 102, jumper wire 115, inner right back contact of relay 111 to ground. Relay 221 operates in this circuit and closes a circuit from battery through the winding of relay 217, winding of relay 222, front contact of relay 221 to ground. Relay 222 operates closing a circuit for lamp 205 to indicate that the connection has been extended to the central office equipment.

Relay 110 also operates in this circuit and closes an obvious circuit through the pull up winding of relay 111. Relay 111 operates and in operating causes the plunger of the line switch to close its associated contacts. Relay 111 also opens the circuit of relay 110, but relay 110 being slow to release holds its armature attracted until, due to the operation of the plunger, a substitute circuit is closed for the right or holding winding of relay 111. The operation of the plunger extends the tip and ring conductors through the side switch to the line relay 130 of the first selector, which relay operates, in turn operating relay 131. The operation of relay 131 connects ground through the plunger contacts to the left winding of relay 111 holding that relay operated, over the jumper wire 116 to the sleeve of the subscriber's central office equipment to mark it busy and, by way of clip 106, to plug 211 and jack 208 and the winding of relay 220.

Relay 220 operates in this circuit and closes an obvious circuit for operating relay 213. The operation of relay 213 connects the ring conductor from the subscriber's substation over contact 109 of plug 102, tip of plug 210 and jack 207, contact 214 of jack 200, inner left front contact of relay 213, winding of relay 221, contact 218 of jack 201, sleeve of jack 207 and plug 210, contact 114 of plug 102 over jumper wire 115 and thence through the plunger contacts, side switch wiper 133, right winding of relay 130 to ground. The tip conductor is extended over contact 108 of plug 102, tip of plug 209 and jack 206, contact 215 of jack 200, outer left front contact of relay 213, contact 219 of jack 201, sleeve of jack 206 and plug 209, contact 113 of plug 102, jumper wire 112, and thence over the plunger contact, side switch wiper 132 left winding of relay 130 to battery. The operation of relay 213 opens the circuit of relay 212, which in turn opens that of relay 217. However, relay 217 is held operated in the previously traced circuit closed at the front contact of relay 221. The release of relay 212 extinguishes the green lamp 204. The operation of relay 213 also closes an obvious circuit for red lamp 203 indicating that the line switch is operated and that the conductors have been extended through the subscriber's central office equipment.

When the subscriber opens the line in dialing the first set of digits, relay 221 releases, removing ground from the windings of relays 217 and 222 and extinguishing white lamp 205. The release of relay 217 extends the ring conductor from the inner left front contact of relay 213 over the back contact of relay 217 and the inner left front contact of relay 213 to contact 218 of jack 201, thus short circuiting relay 221 and causing that relay to release.

In the case of a temporary ground or cross the following stages occur: If relay 212 operates lamp 204 is lighted. The operation of relay 221 through line relay 110 causes the lighting of lamp 205. When the line switch operates to cause the operation of relay 213 lamps 204 and 205 are extinguished and lamp 203 is lighted. During the progress of a normal call, first green lamp 204 will be lighted then white lamp 205, and then red lamp 203. Lamps 204 and 205 are then retired, leaving lamp 203 lighted during the progress of a call. The repeated lighting of lamp 204 without the subsequent lighting of lamps 203 or 205 would indicate momentary trouble such as a cross connection or ground on the line not of sufficient duration to cause the line switch to operate. If the subscriber attempts a connection and the line switch fails to operate, lamps 204 and 205 will be lighted steadily for a considerable period while the subscriber waits, followed by flashing of the lamp 204 due to the response of relay 212 to the interruptions caused by the dialing at the subscriber's substation. If there is a cross in the central office wiring the line switch will be operated and relay 213 operated lighting lamp 203 alone. It is therefore possible by this circuit arrangement to differentiate between normal calls, temporary troubles on the line, temporary trouble on the central office wiring and failure of the line switch to operate.

In addition the operator is enabled to listen on the subscriber's line by operating key 223 which connects the secondary of repeating coil 416 across the tip and ring conductors leading to the subscriber's line. A circuit is also closed from ground at contact 224 of key 223, through the winding of relay 417 to battery which relay operates and connects the operator's receiver across the primary of repeating coil 416 to permit him to listen. This listening circuit is of such high impedance that it will not trip machine ringing nor will it materally reduce the transmission should the subscriber's line be in use. Jack 202 may be used in connection with either test cord for listening to determine whether the subscriber's line is idle or in use before conducting any tests thereon.

When the subscriber disconnects at the termination of a call, the circuit of relay 220 is opened and that relay releases in turn releasing relay 213 and retiring lamp 203. The test operator may then test the subscriber's line by inserting either test plug in jack 200 or may test the subscriber's central office equipment by inserting a test plug in jack 201. The insertion of this plug in any of the jacks 200, 201 or 202 causes the operation of relay 225 which connects ground over cord 105 to the sleeve conductor of the subscriber's central office equipment rendering the subscriber's line busy to incoming calls.

What is claimed is:

1. In an automatic telephone exchange system, subscribers' lines adapted to be connected by means of a line switch to a selector switch, an operator's desk, an indicating device at said desk, means for inserting said indicating device betwen one of said subscribers' lines and said line switch, means in said indicating device operated in one manner during the normal progress of a call and operated in a different manner to indicate failure of the line switch to operate.

2. In an automatic telephone exchange system, subscribers' lines adapted to be connected by means of a line switch to a selector switch, an operator's desk, an indicating device at said desk, means for inserting said indicating device between one of said subscribers' lines and said line switch, a lamp in said indicating device and means for lighting said lamp momentarily during the progress of a normal connection and steadily to indicate that said line switch has failed to operate.

3. In a wire chief's testing system, a test circuit comprising a plurality of keys and associated apparatus for testing subscribers' lines and terminating in a plug, a jack ended trunk circuit, a series of automatic switches controllable from said test circuit with said plug inserted in said jack to connect said test circuit with a subscriber's line and means in said trunk circuit automatically responsive to the removal of said plug from said jack for preventing the release of said switches when said plug is removed from said jack.

4. In a wire chief's testing system, a test circuit comprising a plurality of keys and associated apparatus for testing subscribers' lines and terminating in a plug, a jack ended trunk circuit, a series of automatic switches controllable from said test circuit with said plug inserted in said jack to connect said test circuit with a subscriber's line, means in said trunk circuit automatically responsive to the removal of said plug from said jack for preventing the release of said switches, and means in said trunk circuit for releasing said switches.

5. In a wire chief's testing system, a test circuit comprising a plurality of keys and associated apparatus for testing subscribers' lines and terminating in a plug, a jack ended trunk circuit, a series of automatic switches controllable from said test circuit with said plug inserted in said jack to connect said test circuit with a subscriber's line, a relay in said trunk circuit, means for automatically operating said relay when said plug is inserted in said jack, an auxiliary relay, and means automatically responsive to the removal of said plug from said jack for maintaining said first relay operated and for operating said auxiliary relay to hold said automatic switch as positioned.

6. In a wire chief's testing system, a test circuit comprising a plurality of keys and associated apparatus for testing subscribers' lines and terminating in a plug, a jack ended trunk circuit, a series of automatic switches controllable from said test circuit with said plug in said jack to connect said test circuit with a subscriber's line, a relay in said trunk circuit, means for automatically operating said relay when said plug is inserted in said jack, an auxiliary relay, means automatically responsive to the removal of said plug from said jack for maintaining said first relay operated and for operating said auxiliary relay to hold said automatic switches as positioned, and means in said trunk circuit effective to release said switches.

7. In a wire chief's testing system, a testing circuit comprising a plurality of keys and associated apparatus for testing subscribers' lines and terminating in a plug, jack ended incoming and outgoing trunk lines accessible to said testing circuit, means to extend a connection over said trunk lines, means in said trunk lines operated in response to the insertion of said plug in the jack associated with said trunk and effective upon the withdrawal of said plug from said jack to hold said connection.

8. In a wire chief's testing system, a testing circuit comprising a plurality of keys and associated apparatus for testing subscribers' lines and terminating in a plug, jack ended incoming and outgoing trunk lines accessible to said testing circuit, means to extend a connection over said trunk lines, means in said trunk lines operated in response to the insertion of said plug in the jack associated with said trunk and effective upon the withdrawal of said plug from said jack to hold said connection, and means in said trunk circuit for releasing said connection.

9. In a wire chief's testing system, a testing circuit comprising a plurality of keys and associated apparatus for testing subscribers' lines and terminating in a plug, jack ended incoming and outgoing trunk lines accessible to said testing circuit, means to extend a connection over said trunk lines, means in said trunk lines operated in response to the insertion of said plug in the jack associated with said trunk and effective upon the withdrawal of said plug from said jack to hold said connection, and means in said trunk circuit for releasing said connection whether said plug is in said jack or not.

10. In a wire chief's testing system, a testing circuit comprising a plurality of keys and associated apparatus for testing subscribers' lines and terminating in a plug, jack ended incoming and outgoing trunk lines accessible to said testing circuit, means to extend a connection over said trunk lines, a relay in said trunk circuit operated when said plug is inserted in said jack, and a locking circuit for said relay effective upon the withdrawal of said plug from said jack to hold said connection.

11. In a wire chief's testing system, a testing circuit comprising a plurality of keys and associated apparatus for testing subscribers' lines and terminating in a plug, jack ended incoming and outgoing trunk lines accessible to said testing circuit, means to extend a connection over said trunk lines, a relay in said trunk circuit operated when said plug is inserted in said jack, a locking circuit for said relay effective upon the withdrawal of said plug from said jack to hold said connection and means in said trunk circuit for opening said locking circuit to release said connection.

12. In a wire chief's testing system, a testing circuit comprisng a plurality of keys and associated apparatus for testing subscribers' lines and terminating in a plug, jack ended incoming and outgoing trunk lines accessible to said testing circuit, means to extend a connection over said trunk lines, a relay in said trunk circuit operated when said plug is inserted in said jack, a locking circuit for said relay effective upon the withdrawal of said plug from said jack to hold said connection and means in said trunk circuit for opening said locking circuit to release said connection whether said plug is in said jack or not.

In witness whereof, I hereunto subscribe my name this 26th day of December A. D., 1924.

LOUIS T. COX.